United States Patent [19]
Kroll et al.

[11] Patent Number: 5,646,376
[45] Date of Patent: Jul. 8, 1997

[54] AIRCRAFT WEIGHING SCALE WITH IMPROVED BASE, PLATFORM AND LOAD CELL MOUNTING ASSEMBLY

[75] Inventors: William Kroll, Medina; Mark Browne, Osseo; Tom Bartsch, Plymouth; Randie Evenson, Brooklyn Center, all of Minn.

[73] Assignee: Intercomp Company, Minneapolis, Minn.

[21] Appl. No.: 257,077

[22] Filed: Jun. 9, 1994

[51] Int. Cl.⁶ .............................. G01G 3/14; G01G 19/08
[52] U.S. Cl. .......................... 177/211; 177/238; 177/244; 177/136; 177/DIG. 9
[58] Field of Search .................................. 177/126, 132, 177/133, 136, 238, 239, 262, DIG. 9, 244, 253, 260

[56] References Cited

U.S. PATENT DOCUMENTS

| | | | |
|---|---|---|---|
| 2,868,535 | 1/1959 | Ruge | 177/136 |
| 3,741,328 | 6/1973 | Andersson et al. | 177/136 X |
| 3,949,822 | 4/1976 | English et al. | 177/126 |
| 4,258,814 | 3/1981 | Dillon | 177/126 |
| 4,516,646 | 5/1985 | Bergfalk | 177/DIG. 9 X |
| 4,560,017 | 12/1985 | Hood | 177/DIG. 9 X |
| 4,744,254 | 5/1988 | Barten | 177/DIG. 9 X |
| 4,881,606 | 11/1989 | Halfon et al. | 177/126 |
| 4,969,112 | 11/1990 | Castle | 177/136 X |
| 5,048,624 | 9/1991 | Pike | 177/238 X |
| 5,250,762 | 10/1993 | Gustafsson et al. | 177/244 |
| 5,359,153 | 10/1994 | Herrmann et al. | 177/134 X |

Primary Examiner—Lincoln Donovan
Assistant Examiner—Randy W. Gibson
Attorney, Agent, or Firm—Joel D. Skinner, Jr.

[57] ABSTRACT

A portable aircraft weighing scale, comprising:
(a) a base having load cell mounting structures;
(b) a plurality of shear beam load cells mounted to the base via the mounting structures;
(c) a platform for supporting an aircraft wheel or wheel set; and
(d) a mechanism for mounting the platform to the load cells.

17 Claims, 11 Drawing Sheets

AIRCRAFT WEIGHING SCALE WITH IMPROVED BASE, PLATFORM AND LOAD CELL MOUNTING ASSEMBLY

BACKGROUND OF THE INVENTION

1. Field of the Invention

This invention relates generally to weighing apparatus and particularly to portable, low profile weighing scales. The weighing scale provided by this invention is useful for weighing private, commercial and military aircraft efficiently, reliably and accurately.

2. Background Information

Applicants Kroll et al. disclosed scales in U.S. Pat. Nos. 4,714,121, 4,979,581, and 5,232,964, and load cells in U.S. Pat. Nos. 4,775,018, 4,813,504, and 5,228,527. These scales and associated load cells were designed primarily for weighing land vehicles, such as high performance race cars, and large trucks. The scales and load cells handle a broad range of weights and have varying degrees of accuracy. Additionally, the scales have varied designs in terms of height, weight, portability and method of use. A common design factor shared by all of these scales and load cells is that in each, the mounting of the load cell in and to the scale is unique and provides a significant advantage over the prior art.

The weighing scale assemblies and load cell structures of the present invention are particularly useful for weighing a variety of sizes and types of private, commercial and military aircraft. Total weighs of such aircraft can exceed 1,000,000 lb., as for example in the case of a fully loaded Boeing 747. The required capacity of each scale or weighing pad is in the range of 10,000-60,000 lb. The accuracy of these weighing scales is plus or minus 0.1 percent. These criteria and the particulars of the use environment demand specific mechanical structures for scales, especially the scale platform and the mounting of the load cells to the platform and the remaining elements of the scale.

It is an object of this invention to provide a weighing scale that may be used to weigh aircraft. A further object of this invention is to provide a weighing scale that is extremely strong and yields highly accurate repeatable weighing results. It is a particular object of this invention to provide a scale that has an improved platform member and an improved mechanical structure for mounting one or more load cells to the platform and to a base member. Although the need for a strong, reliable and highly accurate weighing scale such as that provided by the present invention has long existed in the private, commercial and military aircraft industries, none insofar as is known has been proposed or developed.

SUMMARY OF THE INVENTION

The present invention provides portable aircraft weighing scale, comprising:

(a) a base having load cell mounting structures;

(b) a plurality of shear beam load cells mounted to the base via the mounting structures;

(c) a platform for supporting an aircraft wheel or wheel set; and (d) a mechanism for mounting the platform to the load cells.

In a preferred embodiment, the aircraft weighing scale comprises:

(a) a quadrilateral base having four inside corners;

(b) four double ended shear beam load cells, each load cell being mounted to a base and supported from the bottom at two positions, each mounting position being proximate a respective load cell end, the load cell receiving load at a position centrally disposed on a top surface of the load cell, the centrally disposed mounting position having a beveled configuration with a cut away axis extending diagonally with respect to the corner of the base;

(c) means to mount the load cells to the base, the mounting means comprising at least two raised support positions, each support position comprising a raised surface having a central aperture for reception of a load cell mounting screw, at least one pin retaining slot extending from the central aperture, and at least one cylindrical pin disposed in the pin retaining slot, the pin circumferential surface extending above the raised surface;

(d) a platform for contact with a load, the platform comprising a top plate, a beam matrix connected to a bottom surface of the top plate, and a bottom plate connected to a bottom surface of the beam matrix; and (e) means to mount the platform to the load cells, the means to mount the platform to the load cells comprising four mounting assemblies, each mounting assembly being disposed on the bottom surface of the platform in alignment with one load cell, the mounting assemblies each including an engagement member having a downwardly oriented engagement surface of a predetermined configuration for moveable mating with a corresponding surface disposed on a top surface of the load cell.

The invention finally provides an interconnected assembly of individual wheel scales or pads which are communicatively linked by cables to a control unit to permit the weighing and balancing of an aircraft.

The benefits of this invention will become clear from the following description by reference to the drawings.

DESCRIPTION OF THE PREFERRED EMBODIMENTS

The weighing scale 10 according to the present invention provides a selfcontained apparatus for weighing loads of between 10,000–100,000 lb. (5,000–45,350 kg.) with an accuracy of plus or minus 0.1 percent. The scales 10 are fully portable and have a total weight each of approximately 70 pounds (32 kg.), with exterior dimensions of approximately 34 inches (864 mm.) in length and 33.5 inches (851 mm) in width, and 4 inches (102 cm.) in height.

Figure 2:
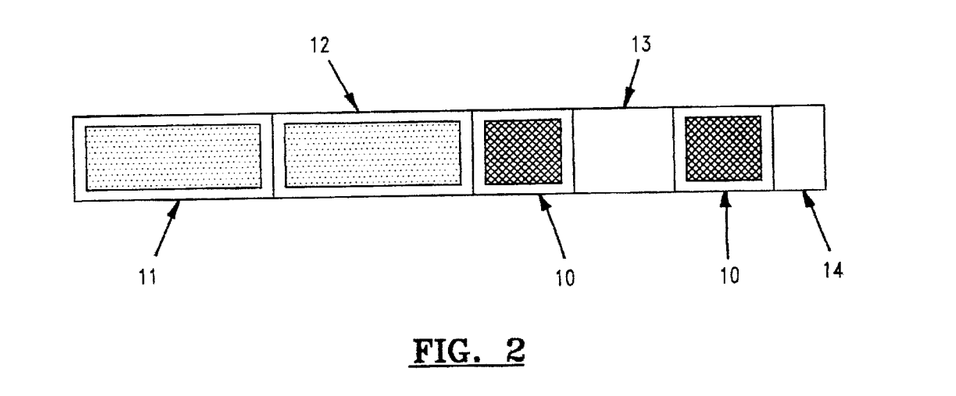
FIG. 2 is a plan view of an aircraft weighing system including the scale of FIG. 1.

For many aircraft weighing procedures, between three and eighteen (3–18) scales 10 are communicatively connected to a central control unit (not shown), preferably an AC100™ Central Processing Unit manufactured and sold by Intercomp Company of Minneapolis, Minn. One or more scales 10 are typically placed under each wheel or wheel set of an aircraft to enable the system to measure the total weight of that aircraft. The weight sensed at each scale 10 may also be determined. Referring to FIG. 2, on/off ramps 11 and 12, spacer pads 13 and wheel stops 14 may be used to position the aircraft on the scales 10. Each scale 10 is a self-contained unit which is also capable of operation alone, for example to weigh a small aircraft. Although in the instant example, the structure and function of the scale 10 is discussed in the context of aircraft weighing, the teachings of this invention are useable to produce scales for use in other fields.

Figure 1:
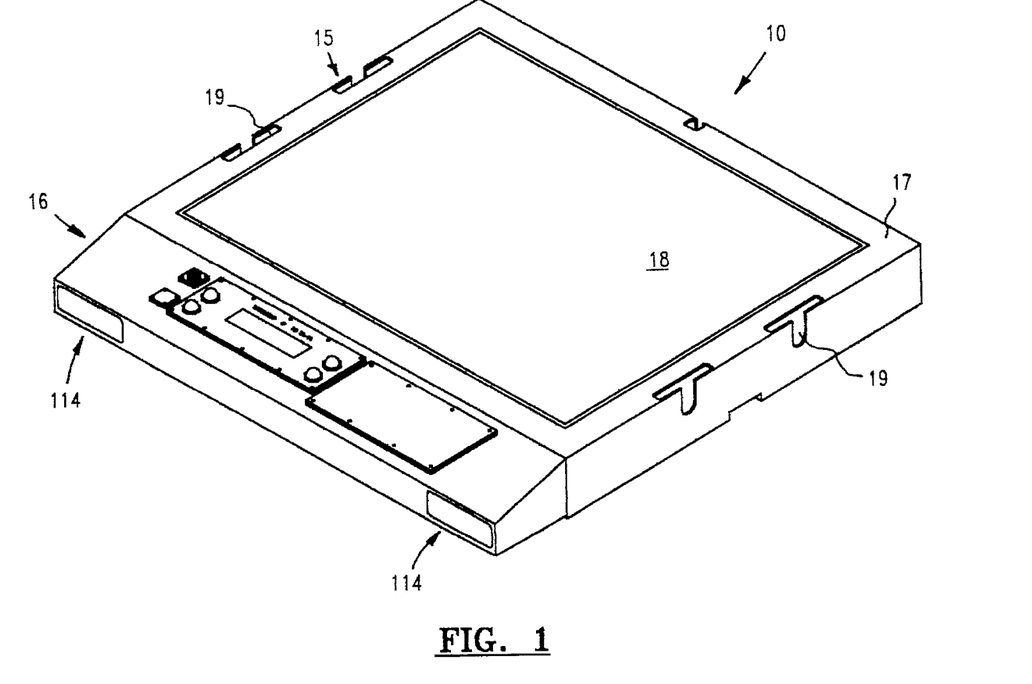
FIG. 1 is a perspective view of an aircraft weighing scale of the present invention.

Referring to FIG. 1, the scale 10 of the present invention comprises a weigh pad portion 15 and an electronic control/indicator portion 16 which are joined in a unitary structure. The pad portion 15 of scale 10 further comprises a base 17 and a platform 18. The generally square platform 18 has a top surface area which is sufficient to support the object to be weighed by the scale 10, for example, one wheel or tire of an aircraft, and further to provide a stable, sturdy and relatively low profile scale 10. The base 17 has horizontal dimensions which are slightly larger than those of the platform 18. In the instant example, the aircraft tire or load is preferably centered along the middle of the platform 18 so as to be equidistantly spaced from the edges of the scale 10. Slots 19 are disposed at the longitudinal edges of the base 17 for connection with the ramp 12, spacer 13 and tire stop 14.

Figure 3:
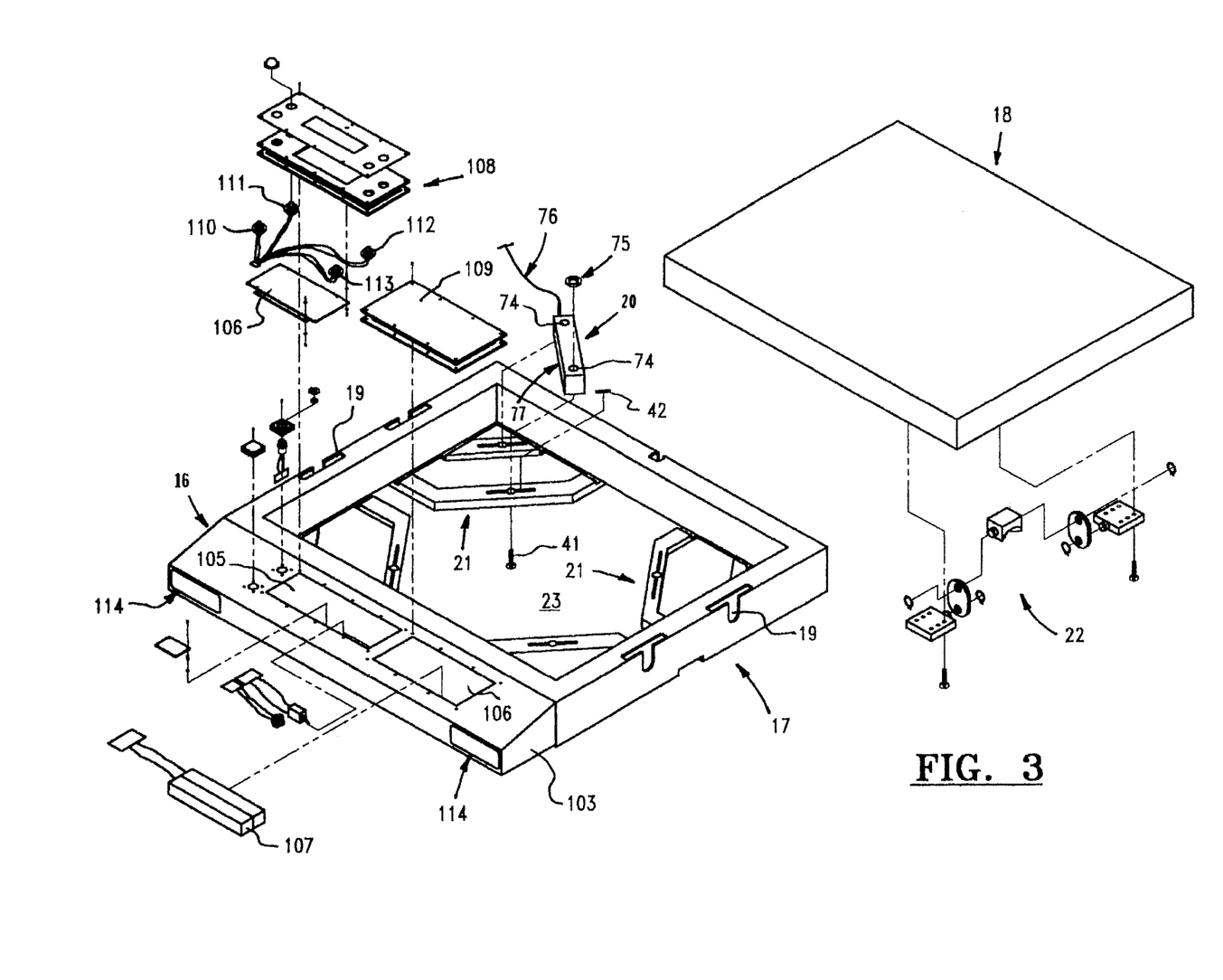
FIG. 3 is a perspective view of the scale, exploded for clarity.
Figure 4:
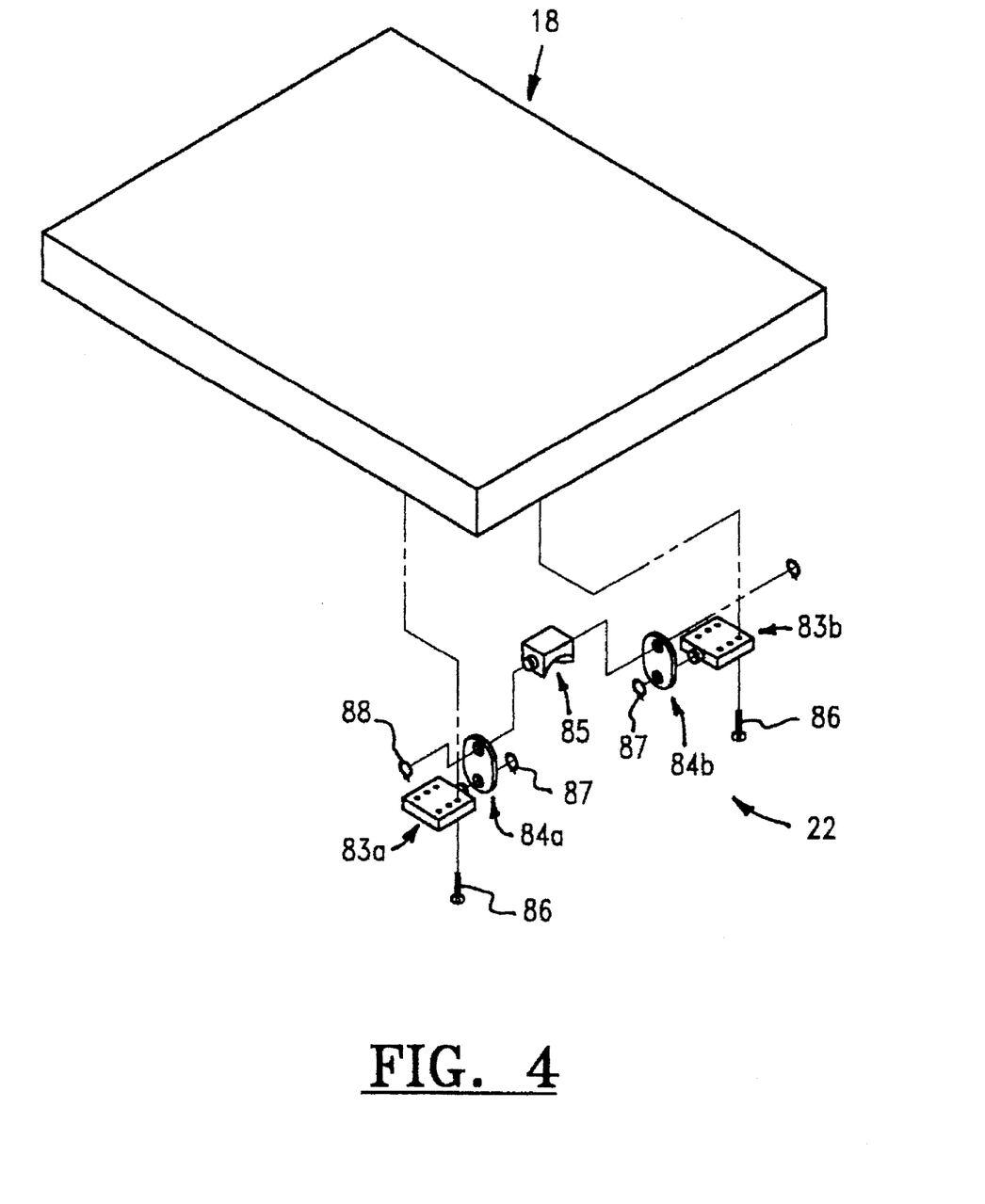
FIG. 4 is a detailed view of the load cell connection assembly disposed on the bottom of the platform of the scale.

Referring to FIG. 3, the base 17 has a central, relatively shallow quadrilateral cavity in which the platform 18 is disposed. In an operative condition, the top surface of the platform 18 is level with the top surface of the base 17 sides. The thickness of the platform 18 is slightly less than that of the base 17. Four load cells 20 are disposed proximate each corner of the interior cavity of the base 17. The load cells 20 are connected to the base 17 via base plates 21. The load cells 20 engage and vertically support the platform 18 via vertical support assemblies 22 which are connected to the bottom of the platform 18. Only one load cell 20 and one support assembly 22 are shown for clarity. In the preferred embodiment, the base 17 has an open bottom 23 to reduce the weight of the scale 10.

Referring also to FIGS. 13, 14, 17 and 18, the base 17 essentially comprises four beams 29a–d which are connected to each other at their respect ends. The base plates 21 are connected the beams 29 at inside corner positions, preferably via welding, and extend underneath the beams 29. The base plates 21 each have a generally flat, thin triangular configuration with first and second major recessed areas 30 and 31. Minor recesses 34 and 35 are formed in the major recess 30. The major recesses 30 and 31 form thin elongated first and second raised areas 32 and 33. Connection apertures 36 and 37 are disposed at predetermined points on each raised area 32 and 33. The connection apertures 36 and 37 are for support and stabilization of the load cells. Each connection aperture 36 and 37 has a circular center portion 38 that is bored through the raised area 32 or 33, and a pair of thin rectilinear slots or channels 39 and 40 which extend in opposite directions away from the center portion 38 and are bored to a predetermined depth in the raised area 32 or 33, but not entirely through. The center portion 38 permits extension of a mounting screw 41 therethrough, and the slots 39 and 40 hold support pins 42. The support pins 42 are steel cylindrical rods of a predetermined diameter such that they are retained in the slots 39 and 40, and extend slightly above the top surface of the raised areas 32 and 33. A stabilizer bar 44 is mounted to one end of each second raised area 33 via screws 45. The stabilizer bar 44 is a rectilinear metal bar of a predetermined thickness or height that functions to prevent downward movement of the platform 18 beyond a certain point, due for example to misalignment or shifting of a load.

Figure 15:
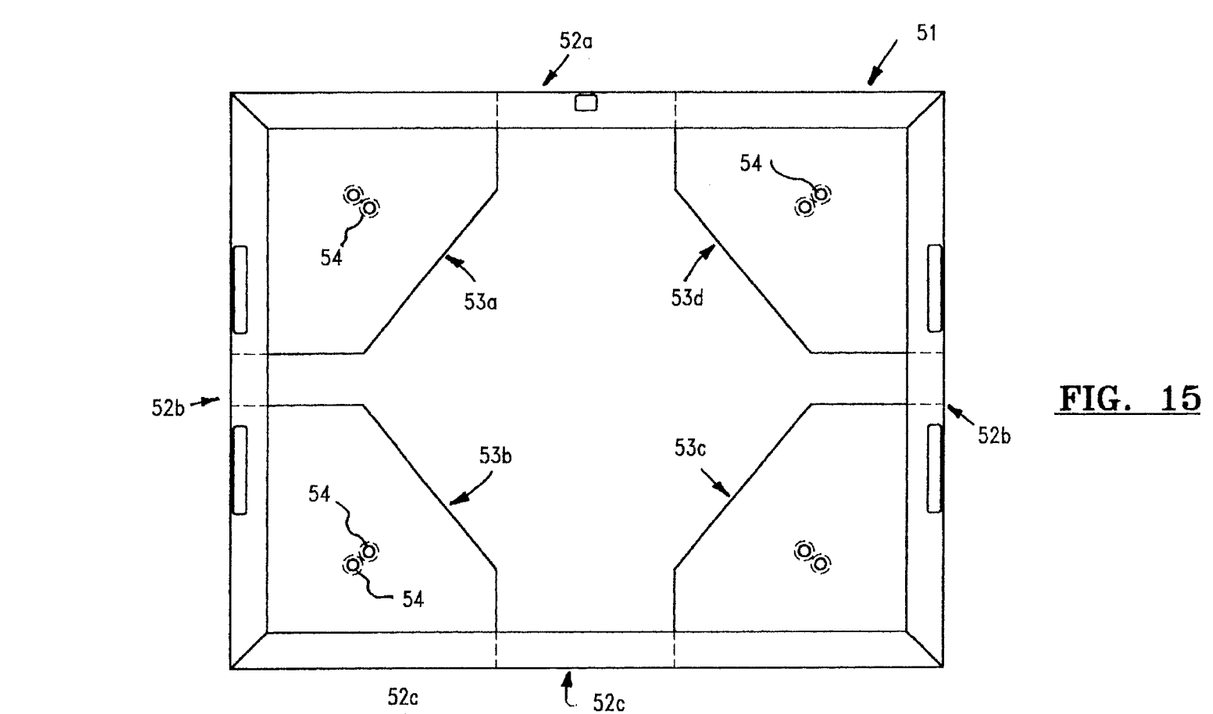
FIG. 15 is a top view of an alternative embodiment of the base.
Figure 16:
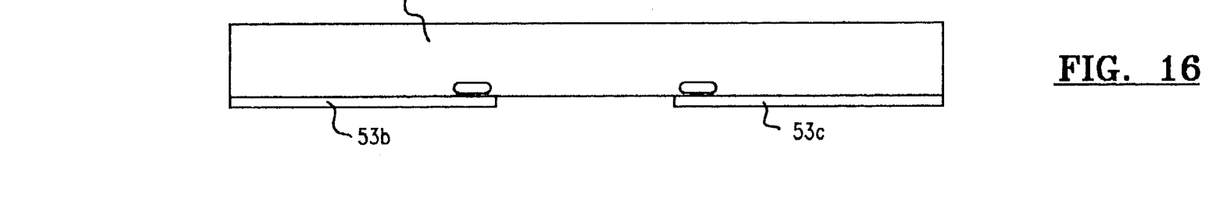
FIG. 16 is a side view of the base shown in FIG. 15.
Figure 17:
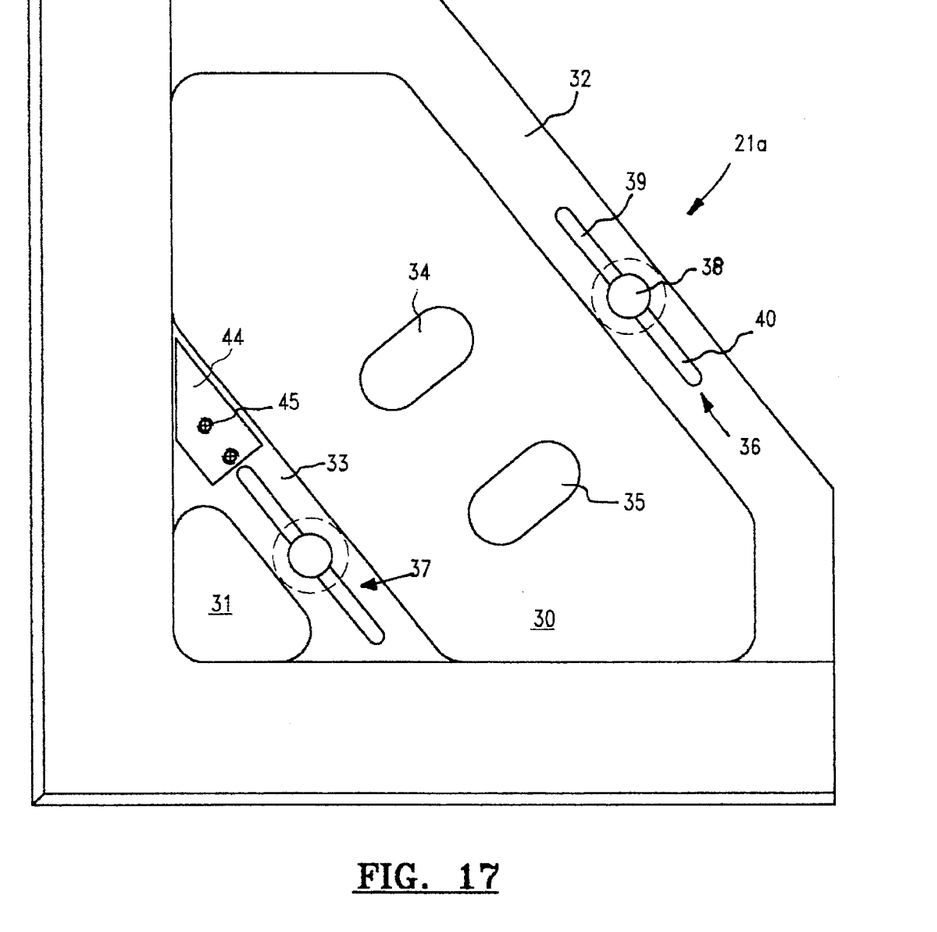
FIG. 17 is a top view of a load cell base plate.
Figure 18:
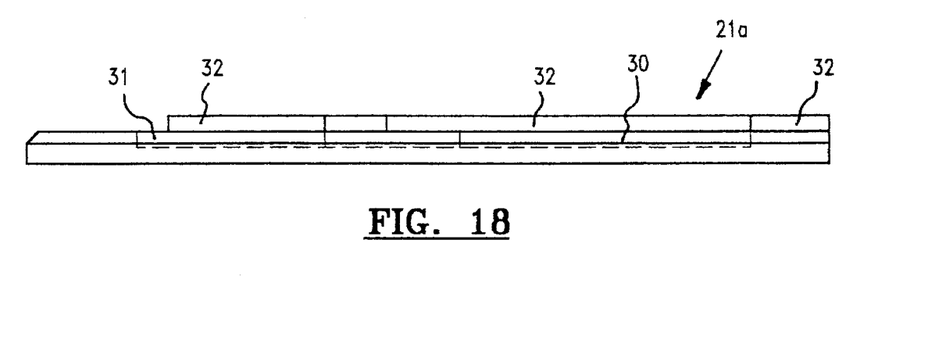
FIG. 18 is a side view of the load cell base plate.

An alternative embodiment of the base 51 is shown in FIGS. 15 and 16. The base 51 is best suited for lighter load capacities of 10,000–30,000 lb. and accommodates lower capacity load cells (not shown). The base 51 consists of side beams 52a–d and base plates 53a–d. The base plates 53 have a uniform flat configuration of a predetermined thickness. Load cell mounting apertures 54 are disposed centrally on the plates 53.

Figure 5:
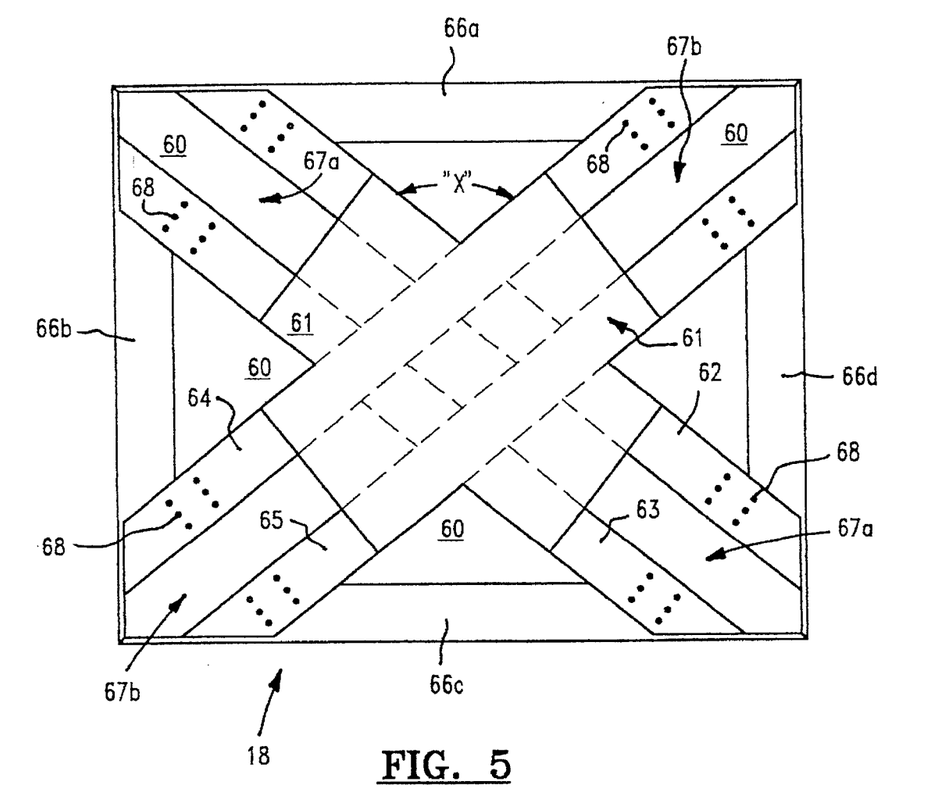
FIG. 5 is a plan view of the bottom of the platform.
Figure 6:
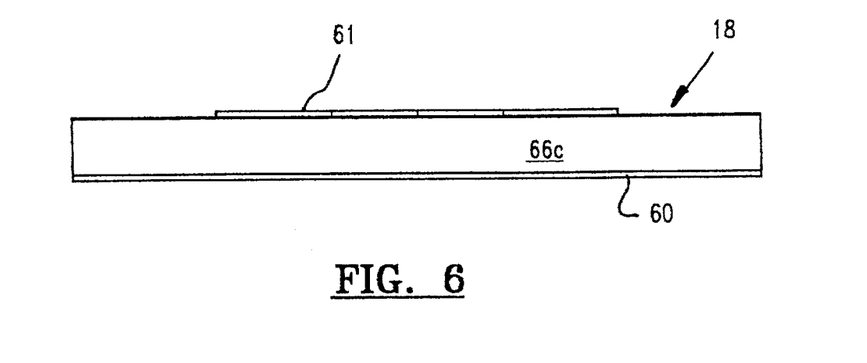
FIG. 6 is a side view of the platform.
Figures 7, 8:
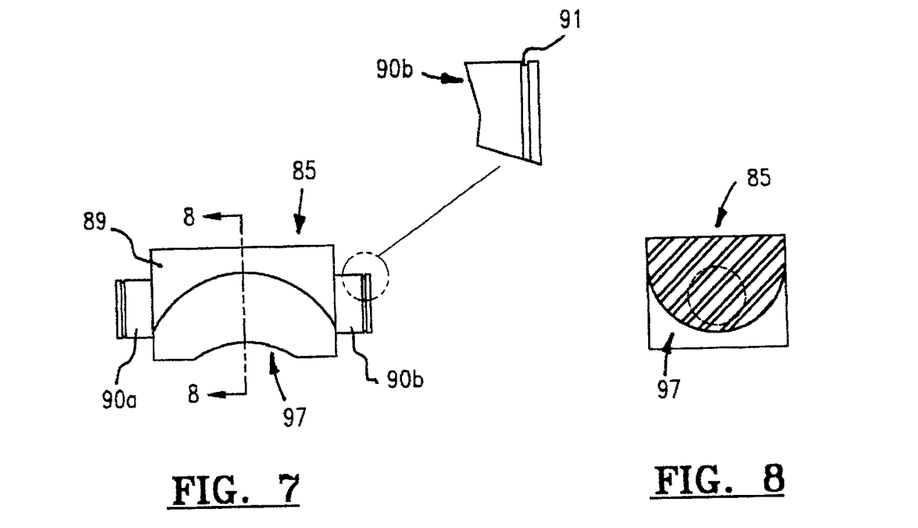
FIG. 7 is a side view of a load cell pin of the load cell connection assembly, including a portion expanded for clarity.
FIG. 8 is a crossectional view of the load cell pin taken along line 8—8 of FIG. 7.
Figure 9:
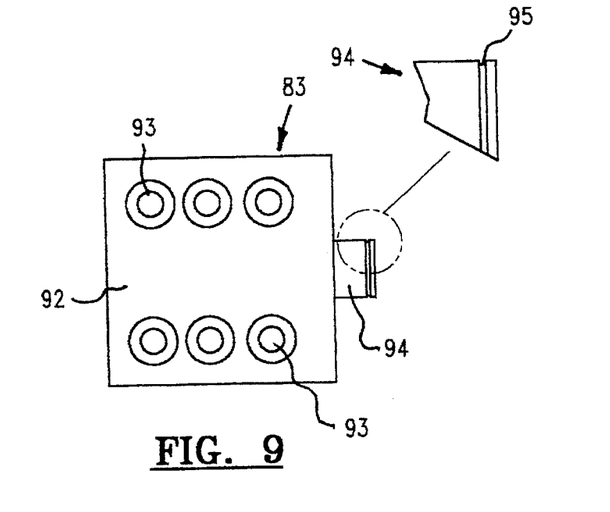
FIG. 9 is a top view of a lower pin of the load cell connection assembly, including a portion expanded for clarity.
Figure 10:
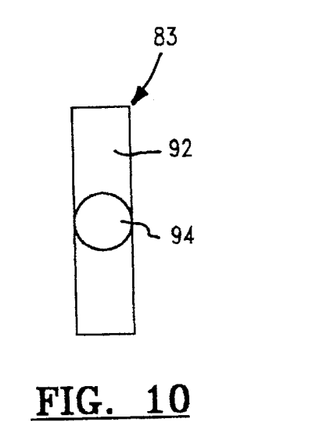
FIG. 10 is a side view of the lower pin.
Figure 11:
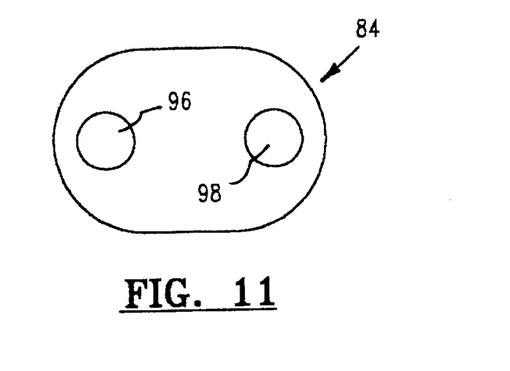
FIG. 11 is a top view of a connecting link of the load cell connection assembly.
Figure 12:
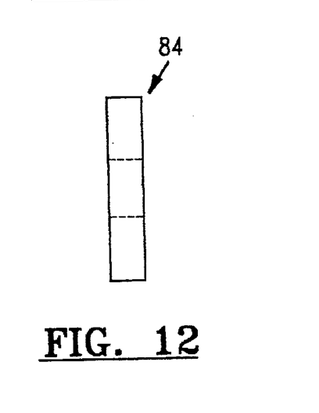
FIG. 12 is a side view of the connecting link.
Figure 13:
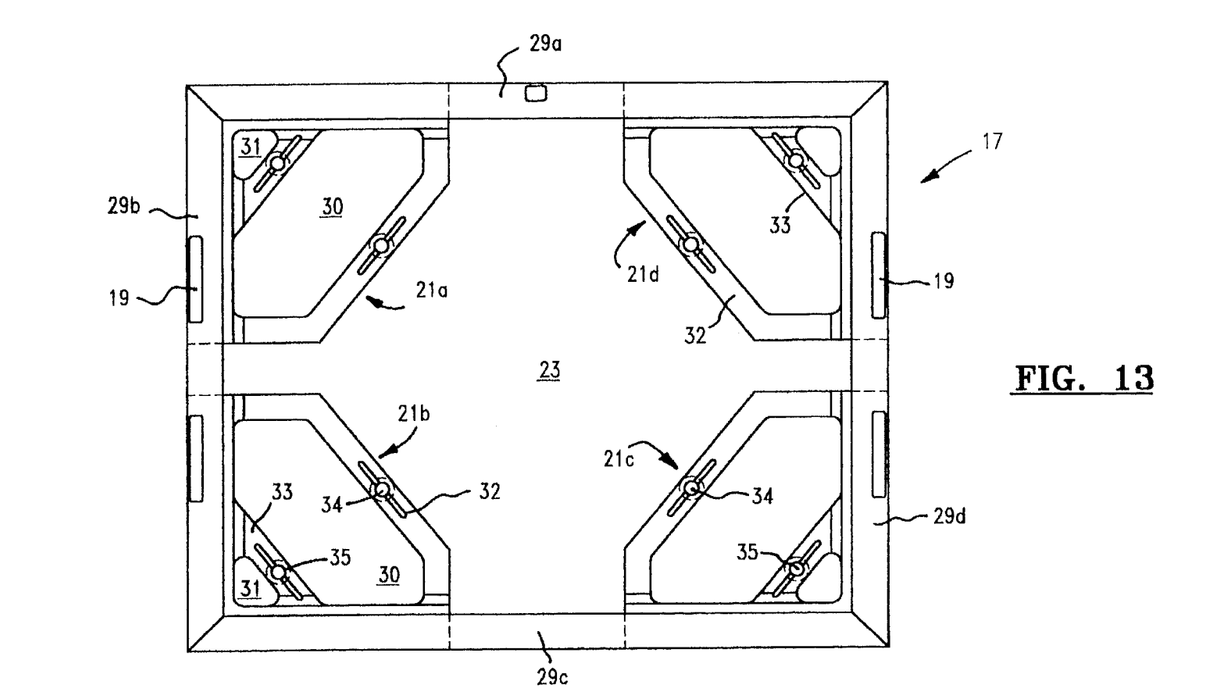
FIG. 13 is a top view of a base of the scale.
Figure 14:
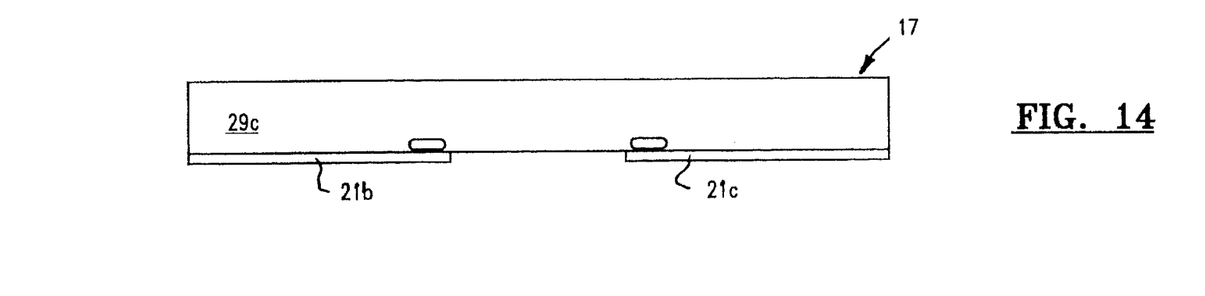
FIG. 14 is a side view of the base.

Referring to FIGS. 5 and 6, the platform 18 consists of a thin top plate 60, a matrix of rigid beams which are disposed below the top plate 60, and a bottom plate 61 which is disposed centrally below the beams. The beams consist of two pairs 62 and 63, and 64 and 65 of spaced parallel cross beams, and four side beams 66a–d. These elements are preferably welded together. Beam pair 62/63 crosses beam pair 64/65 in the center of the platform 18 at an angle "X" of approximately 103 degrees. The bottom plate 61 has a generally X-shaped configuration that corresponds to the intersect area of the crossbeams 62–65. Spaces or channels 67a and b are formed between each crossbeam pair 62/62 and 64/65. The spaces 67 are of a predetermined depth and width to accommodate the various elements of the vertical support assemblies 22. Additionally the length of each space 67 that is open between the bottom plate 61 and the corner of the platform 18 is sufficient to accommodate the length of the load cell 20. Threaded apertures 68 are disposed on the bottom surface of the cross beams 62–65 to accommodate elements of the vertical support assemblies 22. This platform 18 structure provides the capacity for handling the extremely heavy loads often encountered in aircraft weighing operations.

Referring also to FIGS. 4 and 7–12, a vertical support assembly 22 is disposed on the bottom surface of the platform 18 proximate each corner. The vertical support assemblies 22 transfer load from the platform 18 to the load cells 20 mounted on the base 17. Each assembly 22 consists of a pair of lower pins 83a and b, a pair of connecting links 84a and b, and an upper pin 85. The lower pins 83 are connected to the threaded apertures 68 on the beams 62–65 via screws 86. The connecting links 84 are connected to the lower pins 83 via retaining rings 87, and to the upper pin 85 via retaining rings 88. The upper pin 85 has a generally rectangular body 89 with cylindrical members 90a and b extending from opposing ends. A circumferential channel 91 is located near the end of each member 90 for mating with the retaining ring 88. The downwardly disposed side 97 of the upper pin 85 is beveled as shown for mating with the load cell 20 top surface as described further below. The lower pin 83 includes a rectangular body 92 with six apertures 93 for mounting to the platform 18 underside, and a cylindrical member 94 extending from one side thereof. A mating channel 95 is disposed on the member 94 for connection with the retaining ring 87. The connecting links 84 are thin plates with rounded ends and which have a pair of apertures 96 and 98 spaced a predetermined distance apart. The upper aperture 96 mates with one side member 90 of the upper pin 85 and the lower aperture 98 mates with the side member 94 of the lower pin 83 to retain the upper pin in position in the recess 67a or b of the platform 18 while allowing slight movement thereof under a load. This assembly 22 structure is capable of handling the extremely heavy loads typical in aircraft weighing and cooperates with the particular structure of the platform 18, the load cell 20 and its mounting to the base 17.

Referring again to FIG. 3, the load cell 20 is preferably a double ended shear beam type mechanism. Load cells of this type are manufactured by Intercomp Company, for example. The load cell 20 has an elongated generally square crosssectional configuration. A mounting aperture 74 is located proximate each end of the load cell 20. The apertures 74 permit extension of the connection screws 41 therethrough for connection with a nut 75. In an operative orientation, the secured load cell 20 is supported from the bottom, proximate each end by the support pins 42, which extend a predetermined distance above the top surface of the raised areas 32 and 33. This configuration secures the load cell 20 in place, but also allows it to move and undergo shear deformation for proper function. A threaded aperture 43 is disposed in one end of the load cell 20 to receive a cable 76. The cable 76 provides electrical communication between the load cell 20 (as described below) and the control section 16.

In a low capacity scale utilizing the base 51 shown in FIGS. 15 and 16, a single ended shear beam load cell is preferably used. The load cell (not shown) is bolted at one end via screws to the apertures 54. The opposite end of the load cell receives the load from the platform, via a vertically oriented member, for example.

Returning to a discussion of the high capacity scale 10, adjacent each end of the load cell 20 are gauging recesses located in opposing vertical side walls. Strain gauges are disposed in the gauging recesses to measure dimensional changes in the load cell 20 caused by the load. As each strain gauge is mechanically deformed, its length and diameter are altered, resulting in a change in its electrical resistance. This resistance change is measured in accordance with Poisson's Ratio to yield a weight value proportional to the load applied to the load cell 20. A central load bearing area is formed in the body of the load cell 20, between the gauging recesses. The midportion 77 of the top of the load cell 20 has a predetermined beveled configuration for mating engagement with the vertical support assembly 22. The midportion 77 configuration is substantially identical to that of the beveled underside midportion 97 of the upper pin 85 of the vertical connecting assembly 22. In an operative orientation, the axis A—A of the load cell midportion 77 is aligned diagonally with respect to it respective corner of the base 17, and the axis B—B of the upper pin midportion 97 is aligned directly with its respective corner of the platform 18. The respective axis A—A and B—B of the midportions 77 and 97 cross one another at a 90 degree angle and provide a point of moveable contact thereinbetween.

The load cell 20 elements cooperate with the platform 18 support assembly 22 and base 17 to permit free vertical movement with resulting shear deformation of the elevated double ended beam structure of the load cell 20. Thus, as a load is placed on the platform 18, it is transferred to the load cell 20 via the vertical support assembly 22. In particular, force is transferred from the platform 18 to the upper pin 85 through the lower pins 83a and b and connecting links 84a and b. Force from the upper pin 85 is transferred to a single point in the middle of the top of the load cell 20. The load cell 20 is supported at two points from below by the pins 42 contacting it near each end. The cooperation between these structural elements minimizes twisting forces and maximizes shear forces that are representative of the true load, thereby yielding highly accurate weight sensing by the strain gauges.

Referring again to FIG. 3, the control module 16 includes a housing 103 which is preferably constructed of cast aluminum materials to provide EMI/RMI immunity for its internal circuitry. The housing 103 has open cavities 104 and 105 which contain the electronic components and power source of the scale 10. The electronic control components are preferably incorporated in a printed circuit board 106. The circuit board 106 is connected to the load cells 20 via interconnect wiring 76. Slots 114 are provided for mating with lift apparatus (not shown). The electronic components are powered by a battery pack 107 which is based on rechargeable Ni-Cd or Alkaline batteries and provides approximately 50 hours of continuous use. The control module 16 further has a cover 108 including a protective face plate and bezel, an LED or LCD display, ON/OFF, ZERO and LB/KG conversion control switches 110–113.

Referring to FIGS. 19–22, the control components of the scale perform several functions in determining the correct weight of the aircraft. Latitude, altitude, buoyancy and the angle of the load sensor all influence the accuracy of the scale and must be taken into account by the scale.

Although it is the mass of the aircraft that is sought to be determined by the scale, the load cells actually measure the force exerted on the scale by the aircraft. The conversion of mass to force, performed by the earth's gravitational field is not constant and thus presents an accuracy limitation.

Gravity gives a force F to any mass m by Newton's law of universal gravitation:

$$F = \frac{GMm}{r^2} \qquad [1]$$

where M is the mass of the attracting object, G is the gravitational constant, and r is the difference from the centers of the two (assumed spherical masses). G is approximately $3.56 \times 10^{-5}$ lb-ft$^2$/mass pound$^2$.

The gravitational constant G is quite constant with a demonstrated drift of less than 10 part per billion per year. This stability is consistent with the strong equivalence principle of general relativity and is certainly sufficient for electronic weighing. The effects of latitude, altitude, bouyancy and scale inclination are discussed below. A preferred control component embodiment and process steps are also disclosed.

The Influence of Latitude

An object located at the earth's equator will weigh less than it would at either pole since the centripetal force of the earth's rotation will pull it away from the earth. The centripetal acceleration on an object traveling in a circular path of radius r and an instantaneous velocity of v is given by:

$$A = \frac{v^2}{r} \text{ or} \qquad [2]$$

$$A = \frac{4\pi^2 r}{p^2} \qquad [3]$$

Using the earth's radius of 3960 miles and a rotational period of 24 hours the centripetal acceleration is approximately 0.11 ft/sec$^2$. This is about 0.35% of the standard estimate for the earth's acceleration of 32 ft/sec$^2$ and thus is a significant error.

Figure 19:
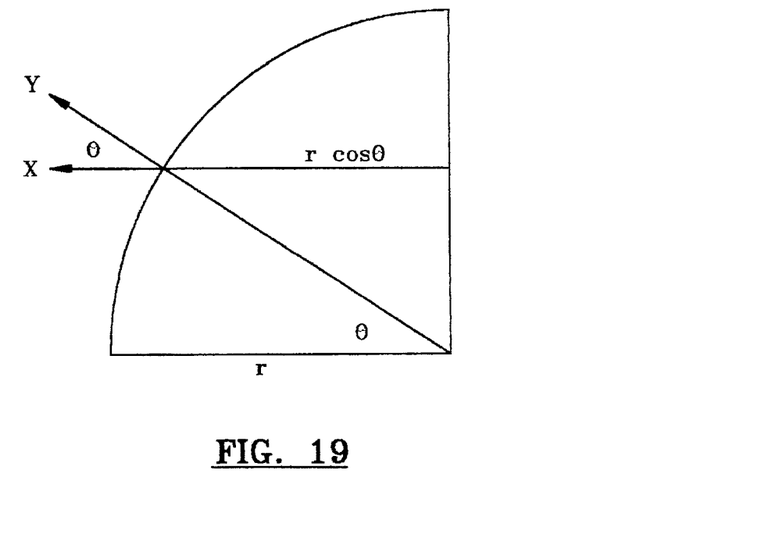
FIG. 19 is graph depicting the centripetal forces on an object at zero degrees latitude.

Referring to FIG. 19 and the object at θ degrees North latitude, there are two factors which will reduce the centripetal acceleration. The first is that the orbital radius is reduced to r cos θ. Using Eq. 3 centripetal acceleration is given as:

$$A = \frac{4\pi^2 r \cos\theta}{p^2} \qquad [4]$$

Eq. 4 provides the centripetal acceleration along the "x" vector while the electronic scale is oriented to measure forces along the "y" vector. Thus, correction must be made for the second factor by calculating the resultant centripetal acceleration along the "y" vector. This will be along the "x" vector multiplied by cos θ. This resultant is then:

$$A = \frac{4\pi^2 (r\cos\theta)^2}{p^2} \qquad [5]$$

The resultant centripetal acceleration from Eq. 5 can now be subtracted from a fixed "standard" value of the earth's acceleration giving a latitude corrected value of:

$$A = 32.22 - \frac{4\pi^2 (r\cos\theta)^2}{p^2} \qquad [6]$$

This calculation corrects for most, but not all of the latitude variation in gravitational acceleration as the earth's ellipsoidal shape also affects the latitude influence. One standard formula is:

$$A = 32.0881(1 + 0.005305 \sin^2\theta - 0.0000059\sin^2 2\theta) \qquad [7]$$

An equally accurate formula which is easier to calculate in microprocessor systems without trigonometric functions is:

$$A = 32.088672 - 0.000254 \cdot \theta + 0.000071 \cdot \theta^2 - 0.000000053 \cdot \theta^3 \qquad [8]$$

Note that the variation from the poles to the equator is 0.17 ft/sec$^2$ which is a difference of about 0.5 or about 5000 parts per million (ppm). The error from a 45 degree altitude calibration to either extreme will only be half of this of about 2500 ppm. To correct for this latitude error one can calculate the acceleration by either Eq. 7 or Eq. 8 and then scale the readings accordingly. These formulas will only correct the acceleration to within about 100 ppm due to local variations in gravity. The local gravity is know worldwide to within about 10 ppm. Thus, it is helpful to also know the longitude of the weighing location.

The Influence of Altitude

The greater the altitude of an object the less the gravitational acceleration will be by Eq. 1. For an object at an altitude h above sea level, the acceleration will be given by Eq. 1 (divided by m) and is:

$$A' = \frac{GM}{(r+h)^2} \qquad [9]$$

To investigate the effect of increasing altitude, this expression is differentiated with respect to h:

$$\frac{\partial A'}{\partial h} = \frac{-2GM}{(r+h)^3} \qquad [10]$$

Expanding the denominator, dropping all but the highest order term in r, and substituting $A_0$ for the acceleration at sea level, yields:

$$\frac{\partial A'}{\partial h} = \frac{-2}{r} A_0 \qquad [11]$$

With the values of $A_0$=32.1725 ft/sec$^2$ and r=20,908,800 ft (3960 miles) we arrive at:

$$A' = A_0 - 3.08 \times 10^{-6} h \qquad [12]$$

Figure 20:
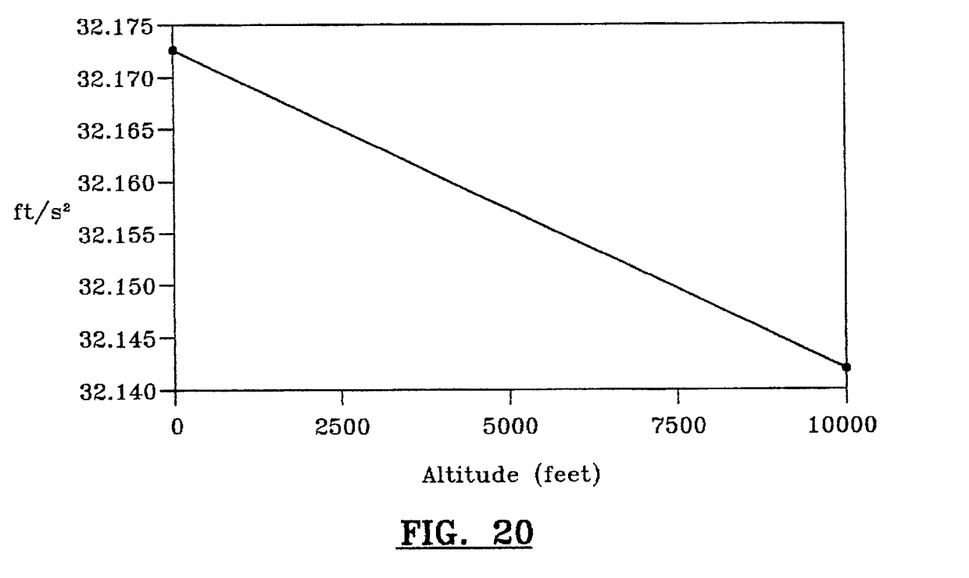
FIG. 20 is a graph showing gravitational acceleration as a function of altitude at 45 degrees latitude.

Here the correction is straightforward and is shown in FIG. 20.

The Influence of Buoyancy.

The density of the earth's atmosphere serves to "lighten" the sensed mass and thus reduces its force. The density of air is affected by the temperature, barometric pressure, and moisture content. A typical density value for high pressure, cold, moist air is 0.081 lb/ft$^3$. A typical density value for low pressure, warm, dry air is 0.064 lb/ft$^3$. Assuming that an average aircraft density of aluminum which is about 170 lb/ft$^3$, the effective density in high density air will now be 170−0.081 or 169.919 lb/ft$^3$. The difference amounts to a potential error of 100 ppm. This calculation is based on sea level parameters.

At an altitude of 10,000 feet the air pressure will be about 70% of that at sea level. This could decrease the worst case low density to about 0.7×0.064 lb/ft$^3$ and lead to a doubling of the error to about 200 ppm.

The effect of temperature and pressure on the density are given by Boyle's ideal gas law. This implies that the density is proportion to the pressure and inversely proportion to the temperature (in degrees from absolute zero). Correction for the moisture effect may be made by calculating the additive density of the water vapor or by consulting standard tables. The density is given by:

$$D = D_0 \frac{T_0}{T} \cdot \frac{P}{P_0} + D_w \qquad [13]$$

where $D_0$, $T_0$, and $P_0$ are the standard density, temperature, and pressure; T and P are the weighing site temperature and pressure, and $D_w$ is the additive density of the airborne water.

The Influence of the Angle of the Load Sensor.

The weighing surface will never be perfectly perpendicular to the earth's radius. An error of three degrees is typically not perceptible to a standing human. This error will reduce the weight reading to cos(3°) of the correct reading. Since cos(3°)=0.99863, the introduced error is 1370 ppm.

A simple bubble level may be added for each horizontal axis and the operator can trim the level. This is less than optimal, is a laborious task to perform, and even if the scale is perfectly leveled in advance, the angle may shift from level due to the weight of the aircraft deforming the pavement.

A better solution is provided by the 2-axis automatic level error sensor or inclinometer incorporated in the scale 10. Sensors detect the angle of inclination with an accuracy of 0.1 degree. At an angle of three degrees, this corresponds to an error in the cosine of 93 ppm. It is vitally important that error correction be performed in the individual load sensing units. In applications where the aircraft weight system includes multiple load sensing units or scales, each unit has its own level error. Maximum accuracy can only be obtained if each unit performs its own angle sensing and correction.

Figure 21:
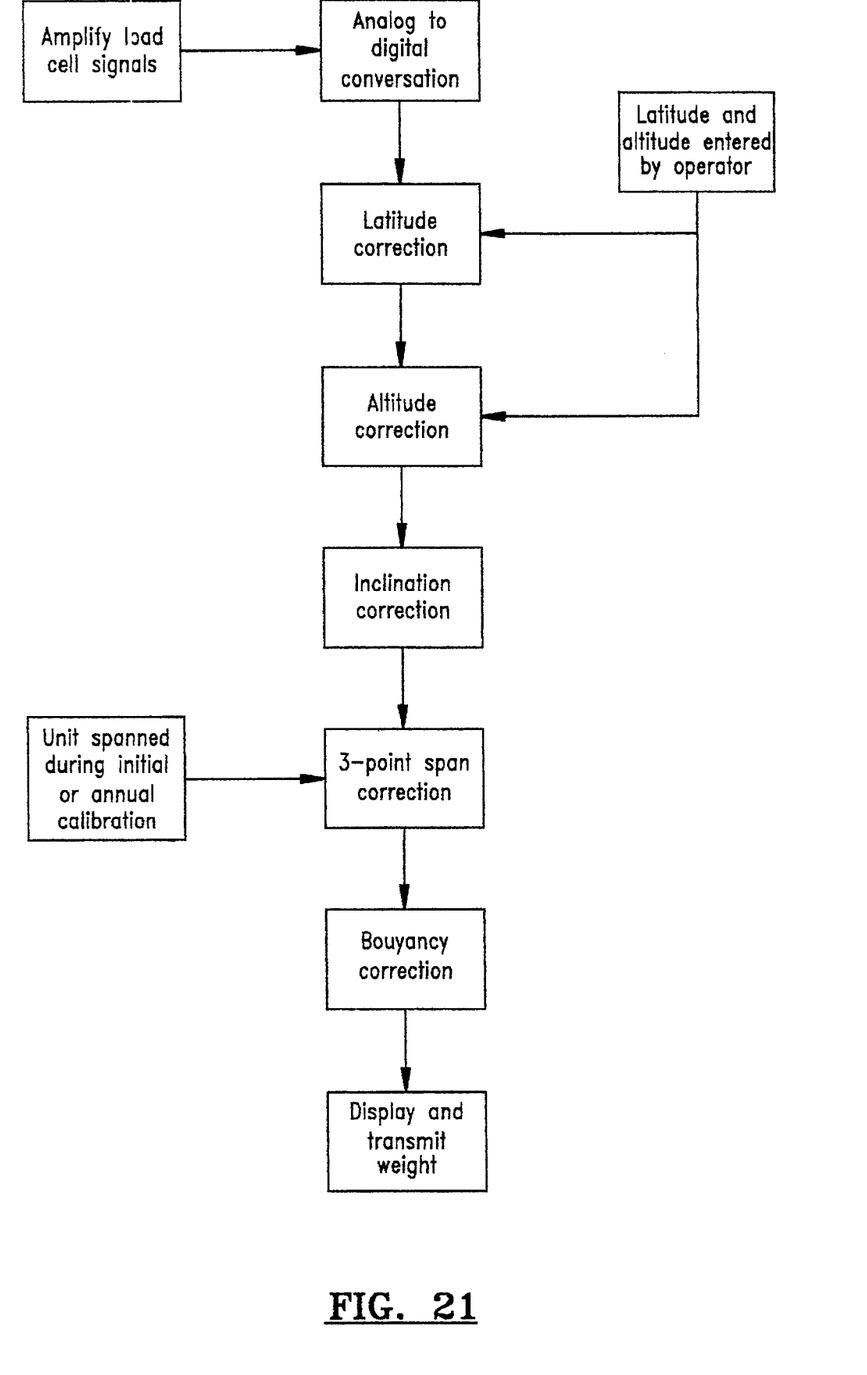
FIG. 21 is a flow chart showing a method of processing weight data utilized by the scale.

FIG. 21 shows the steps performed by the scale 10 in correcting for the effects of latitude, altitude, buoyancy and scale incline on accuracy. Initially, the analog signals provided by the scale load cells are amplified and converted to digital signals. Next, the weight is corrected for latitude and then altitude error. Latitude and altitude information may have been previously entered by the operator and stored in a nonvolatile memory, or alternatively, such information may be read in automatically from a global positioning system receiver. Next, an inclination or "out-of-level" correction is made based on signals from scale level indicators or inclinometers.

Previously, the unit is calibrated with a 3-point span which approximates the nonlinearities of the system with a piece-wise linear continuous function. The number of span points, selected as 3 here, may be any finite number (of approximating line segments). The 3-point span correction is then made to the weight reading. Next, a buoyancy correction is preferably made base on temperature, pressure and humidity data. Temperature, pressure and humidity information may be entered by the operator or provided automatically by appropriate sensors. Finally, the corrected weight is displayed at each scale. Typically, the corrected weight sensed by each scale is also transmitted to a central totalizing location preferably by radio frequency (RF) links. Alternatively infrared links or cables may be used.

Figure 22:
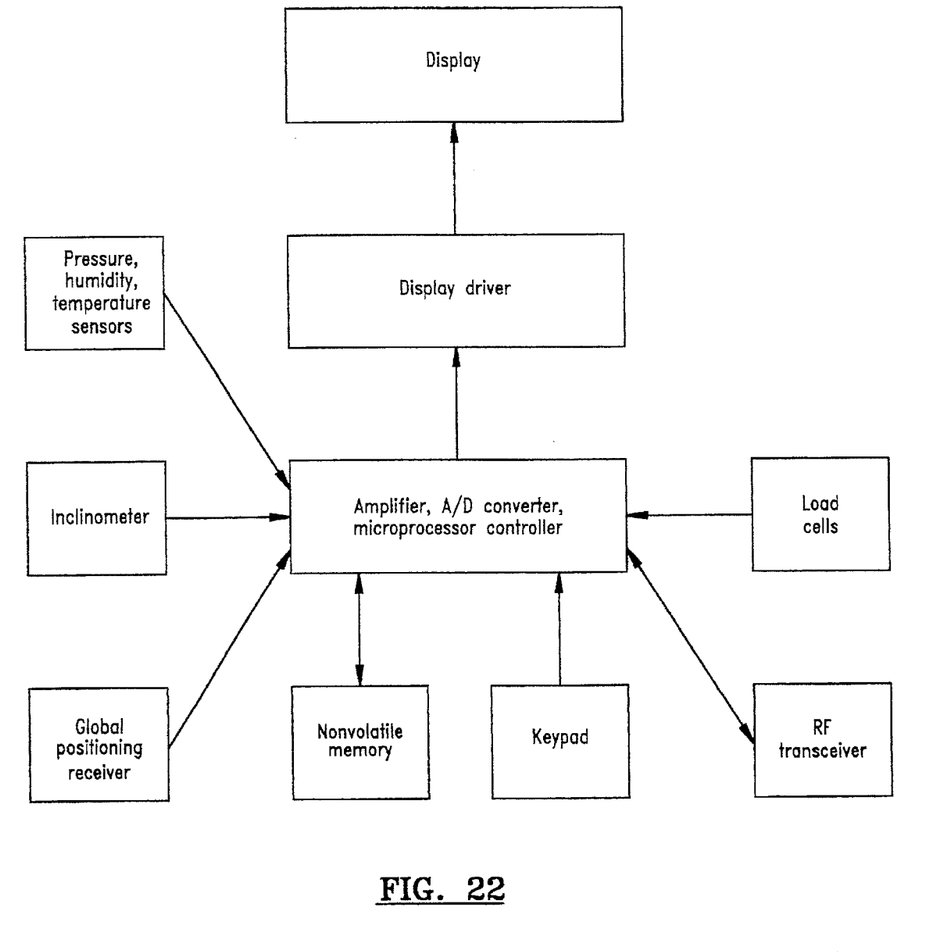
FIG. 22 is a schematic diagram of electronic controls and sensors of the scale.

FIG. 22 shows the main elements of the control circuitry and sensors of the scale 10. Amplifier, A/D converter and microprocessor controller circuitry is central. This circuitry receives input signals from the load cells and keypad (for operator input information). The circuitry communicates bi-directionally with the nonvolatile memory and RF transmitter. The circuitry also receives signals from the inclinometer, and from optional temperature, pressure, and humidity sensors, and a global positioning receiver. The circuitry outputs the weight data to a display driver connected to the display.

As many changes are possible to the embodiments of this invention utilizing the teachings thereof, the descriptions above and the accompanying drawings should be interpreted in the illustrative and not the limited sense.

The invention claimed is:

1. A weighing scale, comprising:
   (a) a base comprising a beam structure having load cell mounting means disposed at interior corners formed by said beam structure, said mounting means comprising at least two raised support positions, said support positions each comprising a raised surface having a central aperture for reception of a load cell mounting screw, at least one pin retaining slot extending from said central aperture and at least one cylindrical pin disposed in said pin retaining slot, said pin circumferential surface extending above said raised surface;
   (b) at least one load cell mounted to said base by said mounting means;
   (c) a platform for contact with a load; and
   (d) means to mount said platform to said at least one load cell.

2. The scale of claim 1, wherein said load cell mounting means are configured to orient said load cells in-line with said respective corners of said base.

3. The scale of claim 1, wherein said support positions are disposed on a thin flat base plate which is connected to at least one corner of said quadrilateral beam structure.

4. The scale of claim 1, wherein said mounting means comprises a flat platform with at least one threaded aperture, said mounting means further comprising a screw, connectable with said threaded aperture for connecting said load cell to said platform.

5. The scale of claim 1, wherein there are four load cells, each load cell being disposed proximate a corner position of a quadrilateral base, each load cell having a rectangular configuration which is lengthwise oriented in-line with its respective base corner.

6. The scale of claim 5, wherein each load cell is a double ended shear beam mechanism.

7. The scale of claim 6, wherein each load cell is mounted to one said base and supported from its bottom at two positions, each said position being proximate a respective end, said load cell receiving load from said means to mount said platform to said load cells at a position centrally disposed on a top surface of said load cell.

8. The scale of claim 7, wherein said centrally disposed mounting position has a beveled configuration with a cut away axis extending diagonally with respect to said corner of said base.

9. The scale of claim 1, wherein said platform has a quadrilateral configuration and is disposed inside the boundaries of said base quadrilateral beam structure, said platform having a top surface which is level with a top surface of said base.

10. The scale of claim 9, wherein said platform comprises a top plate, a beam matrix connected to a bottom surface of said top plate, and a bottom plate connected to a bottom surface of said beam matrix.

11. The scale of claim 10 wherein said beam matrix comprises at least two crossing beams bounded by four side beams, said beam matrix forming a recess area proximate each corner on the bottom side of said platform.

12. The scale of claim 1, wherein said means to mount said platform to said load cells comprises a number of mounting assemblies equal to the number of load cells, each said mounting assembly being disposed on the bottom surface of said platform in alignment with one load cell, each said mounting assembly including an engagement member having a downwardly oriented engagement surface of a predetermined configuration for moveable mating with a corresponding surface disposed on a top surface of each said load cell.

13. The scale of claim 12, wherein said mounting assembly engagement member is an upper pin having a body, said engagement surface being disposed on a bottom surface thereof, with cylindrical mounting members extending horizontally therefrom on opposing ends, said mounting assembly further comprising a pair of lower pins having a body and a cylindrical mounting member extending horizontally therefrom on one side, and a pair of connecting links having a pair of apertures therein, said connecting link apertures being connected to respective said cylindrical members to connect said lower pins to said upper pin.

14. The scale of claim 1, wherein a plurality of scales are interconnected to form a system for measuring the weight of an aircraft, said system further including a control unit and cables for interconnecting each said scale to said control unit, each said scale further comprising means to mount said scale to ramp means, spacer means and wheel stop means.

15. An aircraft weighing scale, comprising:

(a) a quadrilateral base having four inside corners;

(b) four double ended shear beam load cells, each said load cell being mounted to said base and supported from the bottom at two positions, each said position being proximate a respective end, said load cell receiving load at a position centrally disposed on its top surface, said centrally disposed mounting position having a beveled configuration with a cut away axis extending diagonally with respect to said corner of said base;

(c) means to mount said load cells to said base, said mounting means comprising at least two raised support positions, each said support position comprising a raised surface having a central aperture for reception of a load cell mounting screw, at least one pin retaining slot extending from said central aperture, and at least one cylindrical pin disposed in said pin retaining slot, said pin circumferential surface extending above said raised surface;

(d) a platform for contact with a load, said platform comprising a top plate, a beam matrix connected to a bottom surface of said top plate, and a bottom plate connected to a bottom surface of said beam matrix; and (e) means to mount said platform to said load cells, said means to mount said platform to said load cells comprising four mounting assemblies, each said mounting assembly being disposed on the bottom surface of said platform in alignment with one load cell, said mounting assemblies each including an engagement member having a downwardly oriented engagement surface of a predetermined configuration for moveable mating with a corresponding surface disposed on a top surface of said load cell.

16. A weighing scale, comprising:

(a) a base comprising a beam structure and having load cell mounting means;

(b) at least one load cell mounted to said base by said mounting means;

(c) a platform for contact with a load, said platform being disposed inside the boundaries of said base beam structure, said platform having a top surface which is substantially level with a top surface of said base, said platform comprising a top plate, a beam matrix connected to a bottom surface of said top plate, and a bottom plate connected to a bottom surface of said beam matrix; and (d) means to mount said platform to said at least one load cell.

17. A weighing scale, comprising:

(a) a base having load cell mounting means;

(b) at least one load cell mounted to said base by said mounting means;

(c) a platform for contact with a load; and (d) means to mount said platform to said at least one load cell, said means to mount said platform to said at least one load cell comprising a number of mounting assemblies equal to the number of load cells, each said mounting assembly being disposed on the bottom surface of said platform in alignment with one load cell, each said mounting assembly including an engagement member having a downwardly oriented engagement surface of a predetermined configuration for moveable mating with a corresponding surface disposed on a top surface of each said load cell, said mounting assembly engagement member being an upper pin having a body, said engagement surface being disposed on a bottom surface thereof; with cylindrical mounting members extending horizontally therefrom on opposing ends, said mounting assembly timber comprising a pair of lower pins having a body and a cylindrical mounting member extending horizontally therefrom on one side, and a pair of connecting links having a pair of apertures therein, said connecting link apertures being connected to respective said cylindrical members to connect said lower pins to said upper pin.

* * * * *